(12) United States Patent  
Yoon et al.

(10) Patent No.: US 8,897,577 B2  
(45) Date of Patent: Nov. 25, 2014

(54) IMAGE RECOGNITION DEVICE AND METHOD OF RECOGNIZING IMAGE THEREOF

(75) Inventors: Sanghun Yoon, Daejeon (KR); Chun-Gi Lyuh, Daejeon (KR); Ik Jae Chun, Daejeon (KR); Jung Hee Suk, Daejeon (KR); Tae Moon Roh, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 281 days.

(21) Appl. No.: 13/475,867

(22) Filed: May 18, 2012

(65) Prior Publication Data

US 2012/0314940 A1 Dec. 13, 2012

(30) Foreign Application Priority Data

Jun. 9, 2011 (KR) .......................... 10-2011-0055762

(51) Int. Cl.
- *G06K 9/00* (2006.01)
- *G06K 9/62* (2006.01)

(52) U.S. Cl.
CPC ............ *G06K 9/6239* (2013.01); *G06K 9/6269* (2013.01)
USPC .......................................... 382/224; 382/181

(58) Field of Classification Search
CPC ... G06K 9/6267; G06K 9/00288; G06K 9/46; G06K 9/00456; G06K 9/6278; G06K 9/6282; G06K 9/6292; G06K 6/6293
USPC ................... 382/155–161, 224–228, 232–253
See application file for complete search history.

(56) References Cited

U.S. PATENT DOCUMENTS

| | | | | |
|---|---|---|---|---|
| 5,468,069 | A * | 11/1995 | Prasanna et al. | 382/253 |
| 5,602,938 | A * | 2/1997 | Akiyama et al. | 382/155 |
| 6,134,344 | A * | 10/2000 | Burges | 382/155 |
| 6,134,348 | A * | 10/2000 | Nakaya et al. | 382/224 |
| 6,404,923 | B1 * | 6/2002 | Chaddha | 382/224 |

FOREIGN PATENT DOCUMENTS

KR 1020060068541 A 6/2006

OTHER PUBLICATIONS

Kiri L. Wagstaff et al., "Progressive refinement for support vector machines", Data Mining Knowledge Discovery, 2010, pp. 53-69, vol. 20, Springer.

* cited by examiner

*Primary Examiner* — Alex Liew (57) ABSTRACT

An image recognition device in accordance with the inventive concept may include an input vector extraction part extracting an input vector from an input image; a compression vector conversion part converting the input vector into a compression vector using a projection vector; a training parameter generation part receiving a training vector to generate a training parameter using a projection vector obtained through a folding operation of the training vector; and an image classification part classifying the compression vector using the training vector to output image recognition data.

6 Claims, 6 Drawing Sheets

IMAGE RECOGNITION DEVICE AND METHOD OF RECOGNIZING IMAGE THEREOF

CROSS-REFERENCE TO RELATED APPLICATIONS

This U.S. non-provisional patent application claims priority under 35 U.S.C. §119 of Korean Patent Application No. 10-2011-0055762, filed on Jun. 9, 2011, the entire contents of which are hereby incorporated by reference.

BACKGROUND

The present inventive concept herein relates to image recognition devices, and more particularly, to an image recognition device reducing an arithmetic operation for image recognition and a method of recognizing an image thereof.

An image recognition device recognizes an object of things, animals, person, etc. in an image. An image recognition device determines boundaries for distinguishing an object in an image. An image recognition device uses a support vector to set a boundary line for recognizing an object. The support vector sets a location between an object for recognition and a boundary line.

The number of the support vectors and the order of the support vector have great values to classify an image being input, that is, an input vector. As an illustration, a support vector machine uses a nonlinear kernel. Thus, to increase performance of the support vector machine, a lot of support vectors are stored and an internal operation or a euclidean distance operation is performed. In a support vector used to recognize an image, the order N of each support vector reaches several thousands and the number M of support vectors is several hundreds through several thousands. To analyze one image being input into the support vector machine, a multiplying operation of N×N is needed. Thus, millions of registers and multiplying operations are needed. Furthermore, since a lot of hardware is needed for a real time processing, it is difficult to realize them.

A decision function of radial basis function-support vector machine (RBF-SVM) is represented by a mathematical formula 1 below $$f(x) = \text{sign}\left(\sum_{i=1}^{M} \alpha_i y_i e^{-\gamma \|x_{s,k} - x\|} + b\right)$$ [mathematical formula]

Here, $\alpha_i$, $y_i$, $b$, $x_{s,i}$ and $x$ represent a weighted value, class 1 or −1, a bias, ith support vector and an input vector to be classified respectively. In the mathematical formula 1, an image recognition device uses a method of reducing a structure of support vector. Using that method, M may be reduced. Although a principal component analysis (PCA) method may be applied to reduce N, a memory for storing a projection operator obtained through a principal component analysis and the number of multiplication of memory needed for a projection are very large, it is difficult to be applied when an order N is great.

Increases of the number and the order of support vector increase an operation for object recognition.

SUMMARY

Embodiments of the inventive concept provide an image recognition device. The image recognition device may include an input vector extraction part extracting an input vector from an input image; a compression vector conversion part converting the input vector into a compression vector using a projection vector; a training parameter generation part receiving a training vector to generate a training parameter using a projection vector obtained through a folding operation of the training vector; and an image classification part classifying the compression vector using the training vector to output image recognition data.

Embodiments of the inventive concept also provide an image recognition method of image recognition device. The image recognition method may include converting a training vector into a two-dimensional vector having a reduced order through a folding operation; generating a projection vector from the two-dimensional vector; converting the training vector into a training compression vector using the projection vector; extracting a training parameter from the training compression vector; and recognizing an image by classifying an input vector obtained from an input image into the training parameter.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Figure 1:
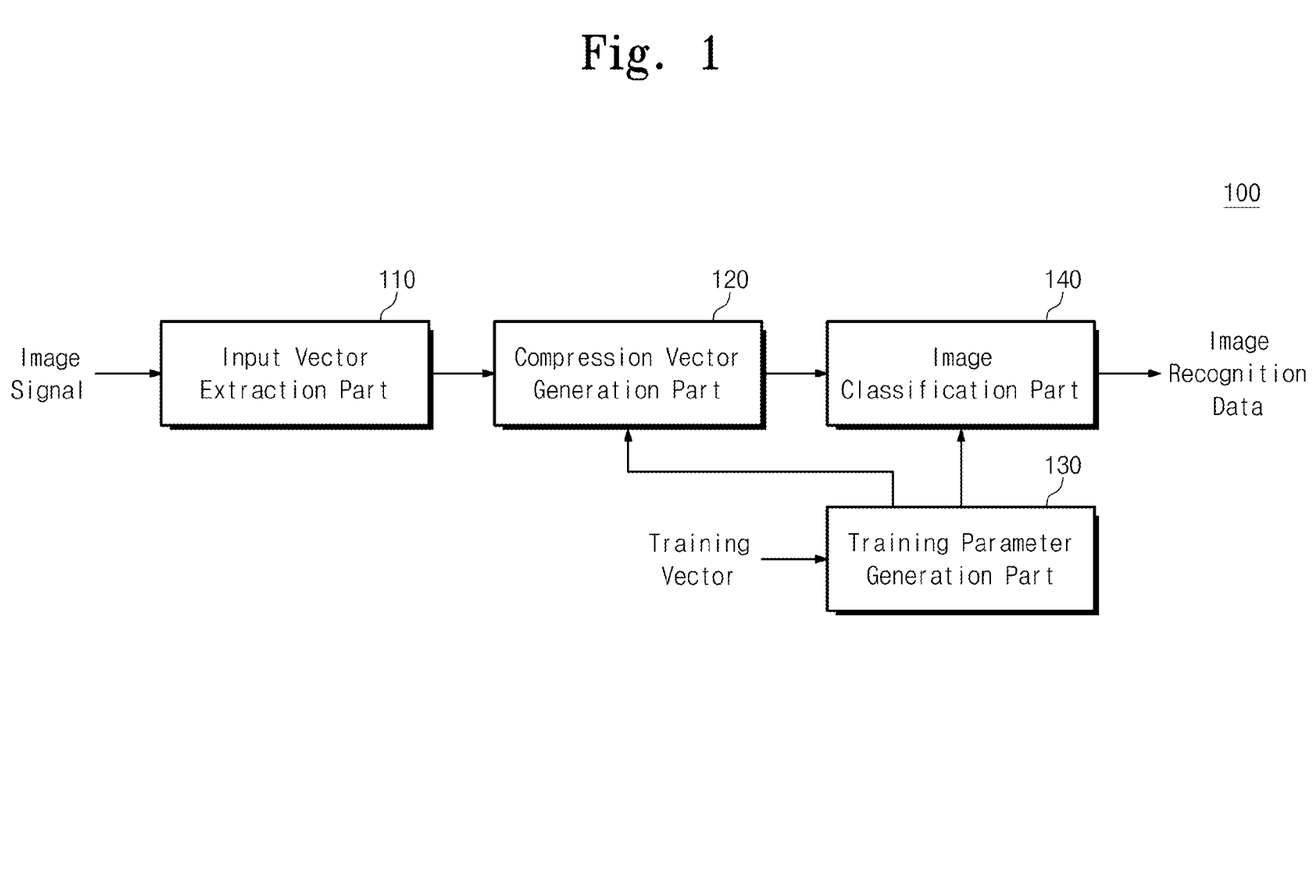
FIG. 1 is a drawing illustrating an image recognition device in accordance with some embodiments of the inventive concept.

FIG. 1 is a drawing illustrating an image recognition device in accordance with some embodiments of the inventive concept.

Referring to FIG. 1, the image recognition device 100 includes an input vector extraction part 110, a compression vector generation part 120, a training parameter generation part 130 and an image classification part 140.

The input vector extraction part 110 receives an image signal to extract an input vector from the received image signal. The input vector extraction part 110 outputs the input vector to the compression vector generation part 120.

The compression vector generation part 120 converts the input vector into a compression vector using a projection vector. The projection vector is a vector which projection-operates into the input vector. The compression vector generation part 120 may use a plurality of projection vectors to generate the compression vector. The compression vector generation part 120 outputs the compression vector to the image classification part 140.

The training parameter generation part 130 receives a training vector to extract a training parameter using a projection vector obtained through a folding operation of the training vector. The training parameter generation part 130 may output the projection parameter to the compression vector generation part 120. The training parameter generation part 130 outputs the training parameter to the image classification part 140.

The image classification part 140 classifies the compression vector using the training parameter. The image classification part 140 can recognize an object from the input image through those processes. The image classification part 140 may be embodied by a support vector machine (SVM). The image classification part 140 outputs image recognition data through object recognition.

The training parameter generation part 130 reduces the order of vector through a folding operation to generate a support vector (i.e., a training parameter). When analyzing (image recognition) the principle component of received image signal using the training parameter, a projection vector which multiplying-operates (projection-operates) into the compression vector has the order of folding-operated vector. Thus, in an image recognition device of the inventive concept, by using training parameters having a reduced order through the folding operation, an operation (e.g., multiplying operation) for image recognition and a size of memory necessary for an operation may be reduced.

Figure 2:
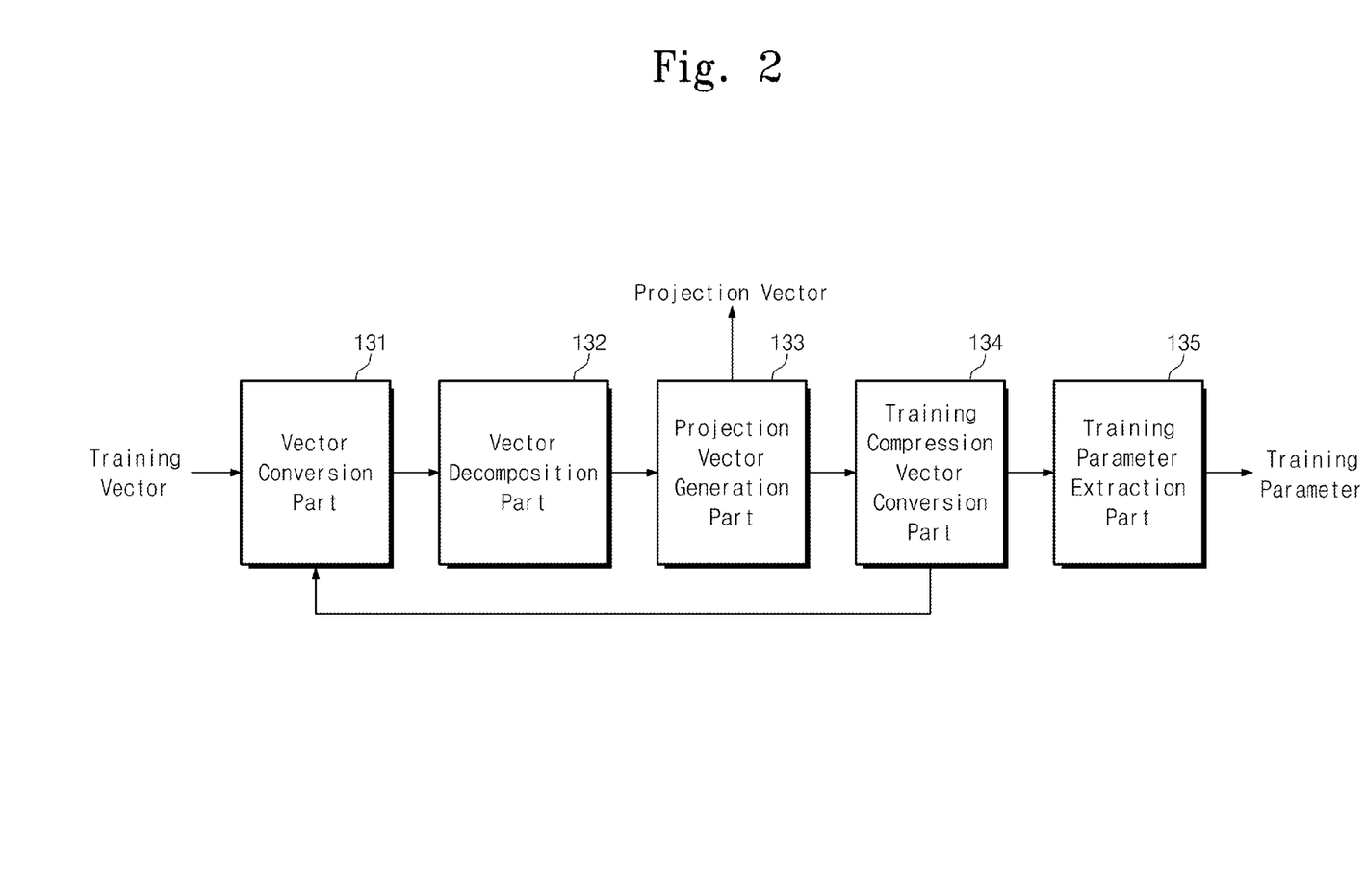
FIG. 2 is a drawing illustrating a training parameter generation part in accordance with some embodiments of the inventive concept.

FIG. 2 is a drawing illustrating a training parameter generation part in accordance with some embodiments of the inventive concept.

Referring to FIG. 2, the training parameter generation part 130 includes a vector conversion part 131, a vector decomposition part 132, a projection vector generation part 133, a training compression vector conversion part 134 and a training parameter extraction part 135.

The vector conversion part 131 converts a training vector being input through a folding operation into two-dimensional vector. The folding operation is an operation reducing the order of resulting value of vector by making an array of vector factors arranged in a row direction in a column direction. The folding operation will be described in detail with reference to FIG. 3. The number of the training vector may be L and the training vector may have the order of MN×K. That is, the vector conversion part 131 reduces the order of the vector generated through the folding operation from NK to K. The vector conversion part 131 outputs the two-dimensional vector to the vector decomposition part 132.

The vector decomposition part 132 decomposes main elements of the two-dimensional vector. The vector decomposition part 132 outputs the decomposed main elements to the projection vector generation part 133.

The projection vector generation part 133 selects the predetermined number of elements in the order of energy level among the decomposed elements to generate a projection vector. The projection vector generation part 133 outputs the projection vector to an image compression vector conversion part.

The training compression vector conversion part 134 receives a training vector. The training compression vector conversion part 134 converts the training vector into a training compression vector using the projection vector. The training compression vector conversion part 134 interleaves the training compression vector using an interleaving vector previously set. The training compression vector conversion part 134 generates the training compression vector through an interleaving of factors constituting a vector, thereby preventing deterioration of image recognition performance generated by the folding operation.

The training compression vector conversion part 134 sets the generated training compression vector to a training vector to repeatedly perform a training compression vector conversion operation (i.e., operations of the vector conversion part 131 through the training compression vector conversion part 134) during the number of times previously set. For this, the training compression vector conversion part 134 outputs the training vector to the vector conversion part 131. The training compression vector conversion part 134 outputs the gathering of the training compression vectors formed by an iterative performance to the training parameter extraction part 135. The training compression vector conversion part 134 can reduce the dimension of the training compression vector depending on the number of the iteration performance of the training compression vector conversion part 134.

The training parameter extraction part 135 extracts training parameters from the gathering of the training compression vectors, that is, the gathering of two-dimensional training vector. The training parameter extraction part 135 may be embodied by a support vector machine to extract training parameters. The training parameter extraction part 135 provides the extracted training parameters to the image classification part 140.

Figure 3:
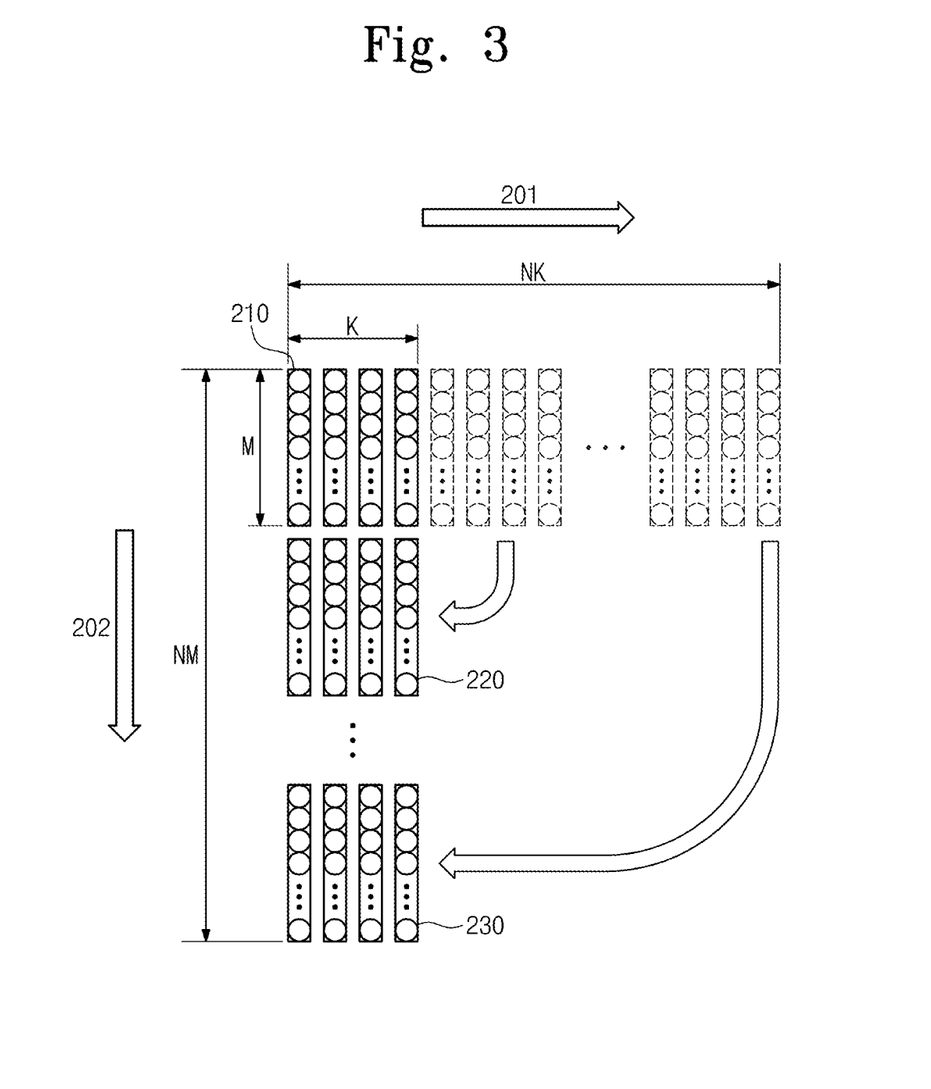
FIG. 3 is a drawing illustrating a folding method in accordance with some embodiments of the inventive concept.

FIG. 3 is a drawing illustrating a folding method in accordance with some embodiments of the inventive concept.

Referring to FIG. 3, the vector conversion part 131 can perform a folding operation of training vectors being input using a folding function. The vector conversion part 131 splits the training vector in a row direction 201. The vector conversion part 131 splits the training vector by a unit k previously set. The vector conversion part 131 arranges factors 210, 220 and 230 of the split training vector in a column direction 202. The folding operation may be performed by the vector conversion part 131 according to the folding function.

A training vector of M×NK is converted into a two-dimensional vector of MN×K through a folding operation. The order of the training vector converted into the two-dimensional vector is reduced from NK to K. The two-dimensional vector having a reduced order is used as a projection vector for projection of the input image and thereby a multiplying operation of the image recognition device may be reduced.

Figure 4:
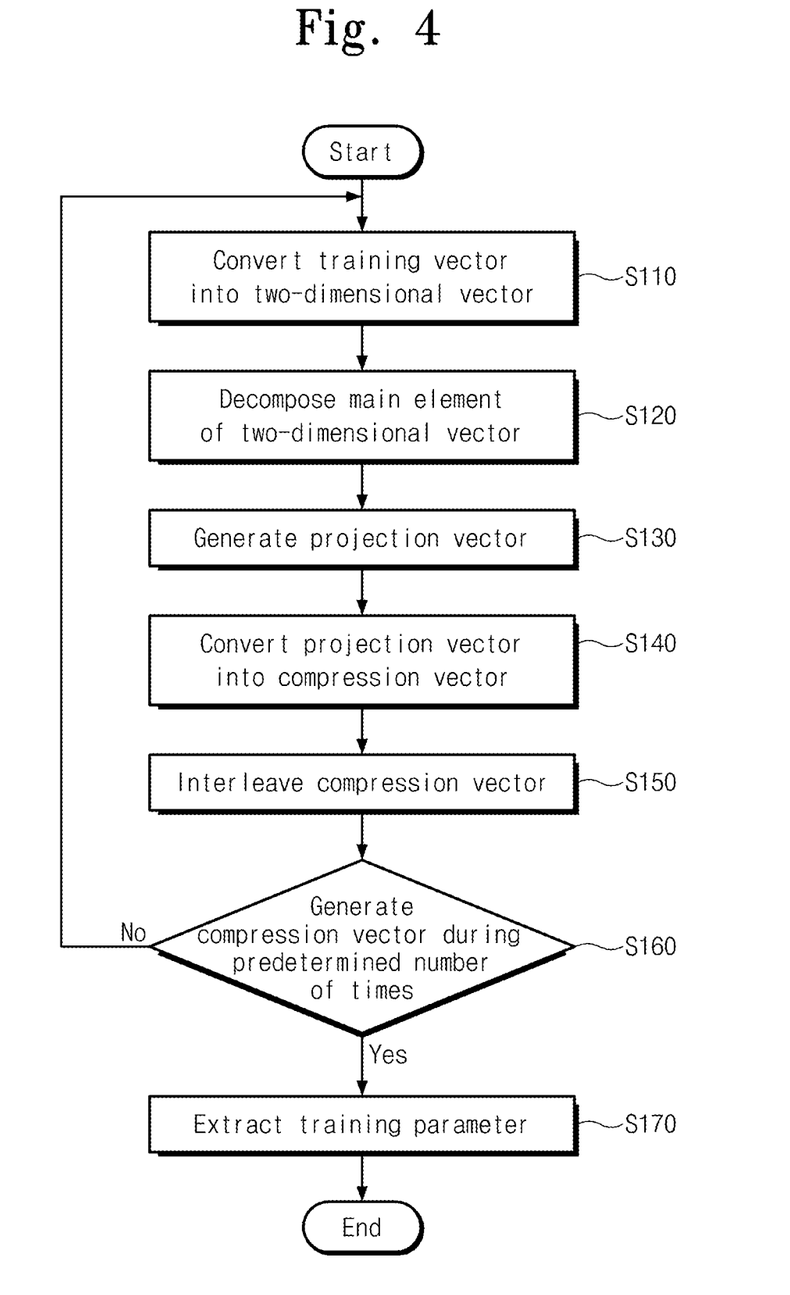
FIG. 4 is a flow chart illustrating an operation of training parameter generator in accordance with some embodiments of the inventive concept.

FIG. 4 is a flow chart illustrating an operation of training parameter generator in accordance with some embodiments of the inventive concept.

Referring to FIG. 4, the vector conversion part 131 converts a training vector being input into a two-dimensional vector through a folding operation (S110). The vector conversion part 131 converts L-training vectors $A_{L \times MN}$ having 'MN' order into a two-dimensional vector $B_{LM \times N}$ according to a folding function previously determined. The conversion into the two-dimensional vector is represented by a mathematical formula 2 below.

$$B = f(A,N) = [a_1^T, a_2^T, a_3^T, \ldots, a_N^T]_D \quad \text{5}$$

$$A = [a_1 | a_2 | \ldots | a_N], a_n \in R^{L \times M}J \quad \text{[mathematical formula]}$$

Subscript 'T' of each factor of the vector represents a transpose matrix. The vector decomposition part 132 decomposes main elements of the two-dimensional vector (S120). The vector decomposition part 132 may use a principal component analysis (PCA) technique. A vector decomposition operation of the vector decomposition part 132 is represented by a mathematical formula 3 below.

$$B = U_A \Lambda_A V_A^T + \tilde{B}_{kD} \quad \text{[mathematical formula 3]}$$

Herein, $U_A$ is an orthogonal matrix and $V_A$ is a unitary matrix. $\Lambda_A$ is a diagonal matrix composed of $\lambda_1$. $\Lambda_A$ is represented in a mathematical formula 4.

$$\Lambda_A = \begin{bmatrix} \lambda_1 & 0 & \ldots & 0 & 0 \\ 0 & \lambda_2 & \ldots & 0 & 0 \\ \vdots & \vdots & \ddots & \vdots & \vdots \\ 0 & 0 & \ldots & \lambda_{n-1} & 0 \\ 0 & 0 & \ldots & 0 & \lambda_n \end{bmatrix}, \quad \text{[mathematical formula 4]}$$

$$\lambda_1 \geq \lambda_{i+1}$$

$\tilde{B}_k$ may be represented by a mathematical formula 5.

$$\tilde{B}_k = [1\ 1\ 1\ \ldots\ 1]^T \times \text{mean}_{col}(B)_D \quad \text{[mathematical formula 5]}$$

Herein, $\text{mean}_{col}(B)$ is a row vector made by an average value with respect to column vectors of array B.

The projection vector generation part 133 selects the predetermined number $P_k$ of elements in the order of energy level among the decomposed elements to generate a projection vector (S130). In a projection vector $C_{MN \times MPk}$ generated from the projection vector generation part 133, the vector C is represented by a mathematical formula 6 below.

$$C = \begin{bmatrix} V_{A,P_k}^T & 0 & \ldots & 0 \\ 0 & V_{A,P_k}^T & \ldots & 0 \\ \vdots & \vdots & \ddots & \vdots \\ 0 & 0 & \ldots & V_{A,P_k}^T \end{bmatrix} \quad \text{[mathematical formula 6]}$$

Herein, each factor of the projection vector C has a relation with $V_A = [v_{A,1}^T, v_{A,2}^T, \ldots, v_{A,K}^T]^T$ and $V_{A,P_k} = [v_{A,1}^T, v_{A,2}^T, \ldots, v_{A,P_k}^T]^T$.

The training compression vector conversion part 134 converts a training vector $A_{L \times MN}$ into $D_{L \times MPk}$ using the projection vector $C_{MN \times MPk}$ (S140). Herein, a training compression vector D is represented by a mathematical formula 7 below.

$$D = (A - \tilde{A}_k) V_{A,P_k} \quad \tilde{A}_k = [\tilde{B}_k, \tilde{B}_k \ldots \tilde{B}_k]_F \quad \text{[mathematical formula 7]}$$

The training compression vector compression part 134 operates the training compression vector D and an interleaving vector F to perform an interleaving (S150). An interleaved compression vector E is represented by a mathematical formula 8 below.

$$E = DF \quad \text{[mathematical formula 8]}$$

The interleaving vector F is represented by a mathematical formula 9 below.

$$F = \begin{bmatrix} 1 & 0 & 0 & 0 & 0 \\ 0 & 0 & 1 & 0 & 0 \\ 0 & 0 & 0 & 0 & 1 \\ 0 & 1 & 0 & 0 & 0 \\ 0 & 0 & 0 & 1 & 0 \end{bmatrix} \quad \text{[mathematical formula 9]}$$

The training compression conversion part 134 sets the compression vector D to a training vector E (D=E). The training compression conversion part 134 performs the S110 through S150 according to the predetermined repeat count K.

The training compression vector conversion part 134 checks whether operations of S110 through S150 are performed as many as the predetermined number of times (S160). If the operations of S110 through S150 are not performed as many as the predetermined number of times, the training compression vector conversion part 134 goes back to the S110. If the operations of S110 through S150 are performed as many as the predetermined number of times, the training compression vector conversion part 134 goes to the S170.

The training parameter extraction part 135 extracts a training parameter from gathering of compression vectors, that is, gathering $E_{L \times P1 \ldots Pk \ldots PK}$ of two-dimensional training vectors (S170).

In the inventive concept, the order of support vector may be reduced by repetition of a folding operation, a compression operation (e.g., PCA compression) and an interleaving operation when extracting the training parameter.

The training parameter generator of the inventive concept performs a work cutting an array being input by using a folding function to stack it. An array according to the folding function can decompose a principal component using singular value decomposition (SVD).

Thus, the training vector being input can obtain a principle component projection operator VA through a principle component analysis after it is cut and stacked by the folding function. The training vector is projected using the principle component projection operator VA being input. The projected vector is rearranged by a column unit through interleave. If performing the folding function and the principle component analysis again, the principle component projection operator VA for projection has not the order of the training vector but the order of the folded vector. Thus, the number of multiplying operations and memories required for compression is reduced. Since classification performance of that method is reduced as compared with the method without performing the folding function, in the inventive concept, an interleaving operation is performed and an overhead used in compression repeatedly performs a small folding operation and a small compression operation and thereby the reduced performance is compensated.

Figure 5:
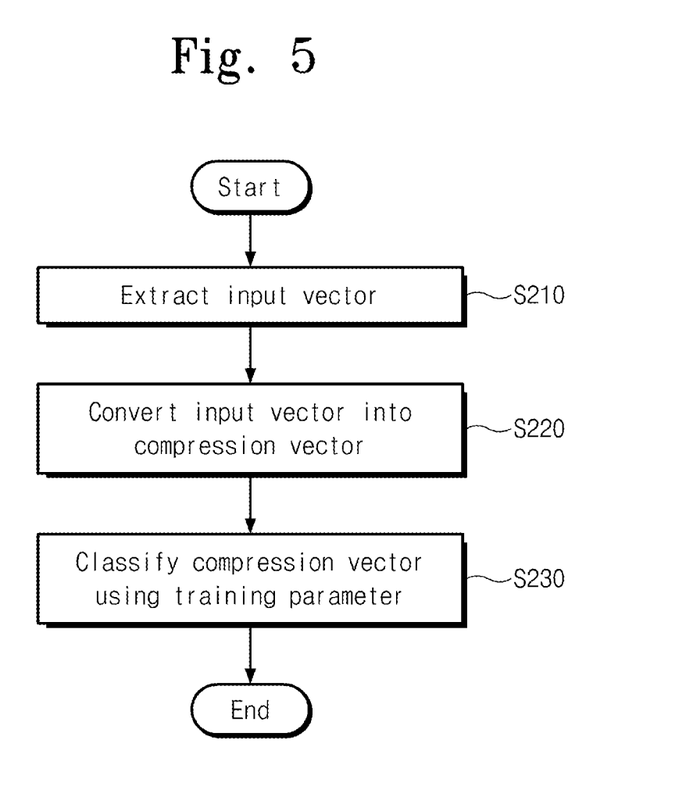
FIG. 5 is a flow chart illustrating an operation of image recognition device in accordance with some embodiments of the inventive concept.

FIG. 5 is a flow chart illustrating an operation of image recognition device in accordance with some embodiments of the inventive concept.

Referring to FIG. 5, the input vector extraction part 110 receives an image signal to extract an input vector from the received image signal (S210).

The compression vector generation part 120 converts an input vector into a compression vector $E_{1 \times P1 \ldots Pk \ldots PK}$ using a projection vector (S220).

The image classification part 140 classifies a compression vector using a training parameter (S230). This can make the image classification part 140 recognize an object from the input image.

Figure 6:
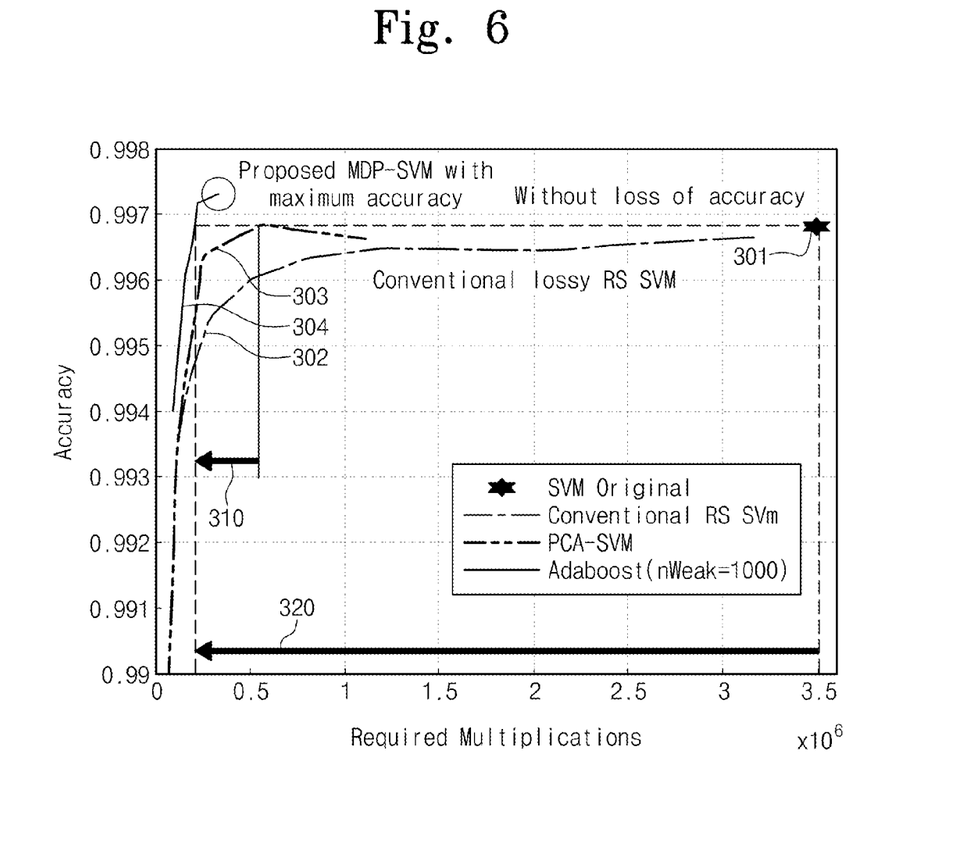
FIG. 6 is a graph illustrating performance of support vector machine in accordance with some embodiments of the inventive concept.

FIG. 6 is a graph illustrating performance of support vector machine in accordance with some embodiments of the inventive concept.

Referring to FIG. 6, a horizontal axis of the graph represents the number of multiplying operations required for image recognition and a vertical axis of the graph represents accuracy. A performance curve 301 of SM technique, a performance curve 302 of RS-SVM technique and a performance curve 303 of PCA-SVM technique are illustrated. A performance curve 304 of Adaboost technique is illustrated.

It is checked through a first arrow 310 that the number of multiplying operations of the performance curve 304 of Adaboost technique is reduced by 60% as compared with the performance curve 303 of PCA-SVM. It is checked through a second arrow 320 that the number of multiplying operations of the performance curve 304 of Adaboost technique is reduced by 90% as compared with the performance curve 301 of SVM.

The image recognition device reduces the order of support vector through a folding operation. That is, the image recognition device can reduce an operation (e.g., multiplying operation) needed to recognize an object. The image recognition device reduces a memory size needed for an operation, thereby increasing utilization of memory.

The image recognition device of the inventive concept can recognize an object in an image through an input image. The image recognition device can be used in various fields such as data classification, face recognition, document retrieval, etc.

According to the inventive concept, the image recognition device can reduce arithmetic operations for image recognition by reducing the order of support vector through a repetitive operation of folding, compression and interleaving.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein.

What is claimed is:

1. An image recognition device comprising:
an input vector extraction part extracting an input vector from an input image;
a compression vector conversion part converting the input vector into a compression vector using a first projection vector;
a training parameter generation part receiving a training vector to generate a training parameter using a second projection vector obtained through a folding operation of the training vector, wherein the training parameter is a vector and the folding operation produces the second projection vector having an order less than an order of the training vector; and
an image classification part classifying the compression vector using the training vector to output image recognition data.

2. An image recognition device comprising:
an input vector extraction part extracting an input vector from an input image;
a compression vector conversion part converting the input vector into a compression vector using a first projection vector;
a training parameter generation part receiving a training vector to generate a training parameter using a second projection vector obtained through a folding operation of the training vector; and
an image classification part classifying the compression vector using the training vector to output image recognition data,
wherein the training parameter generation part comprises:
a vector conversion part converting the training vector into a two-dimensional vector using a folding operation;
a vector decomposition part decomposing a main element of the converted two-dimensional vector;
a projection vector generation part selecting a plurality of elements having a large energy level using the decomposed vector to generate the second projection vector;
a training compression vector conversion part converting the training vector into a training compression vector using the second projection vector; and
a training parameter extraction part extracting a training parameter from a training vector gathering composed of the training compression vector.

3. The image recognition device of claim 2, wherein the folding operation divides factors of the training vector arranged in a row direction into the plural number and reduces the order of the training vector by making an array of the divided factors in a row direction.

4. The image recognition device of claim 2, wherein the vector conversion part interleaves the two-dimensional vector to output it to the vector decomposition part.

5. The image recognition device of claim 2, wherein the training compression vector conversion part sets the training compression vector to the training vector and inputs the training compression vector in a vector input part to repeatedly obtain other training compression vector during the number of times previously set.

6. The image recognition device of claim 2, wherein the image classification part is a support vector machine.

* * * * *